(12) United States Patent
Agrawal et al.

(10) Patent No.: US 6,363,108 B1
(45) Date of Patent: Mar. 26, 2002

(54) PROGRAMMABLE MATCHED FILTER SEARCHER

(75) Inventors: Avneesh Agrawal, Sunnyvale; Qiuzhen Zou, La Jolla, both of CA (US)

(73) Assignee: Qualcomm Inc., San Diego, CA (US)

( * ) Notice: Subject to any disclaimer, the term of this patent is extended or adjusted under 35 U.S.C. 154(b) by 0 days.

(21) Appl. No.: 09/283,010

(22) Filed: Mar. 31, 1999

(51) Int. Cl.⁷ .............................. H04B 1/707; H04B 1/10
(52) U.S. Cl. ...................... 375/152; 375/343; 708/314
(58) Field of Search ............................... 375/152, 343, 375/350; 708/301, 300, 314

(56) References Cited

U.S. PATENT DOCUMENTS 5,577,025 A * 11/1996 Skinner et al. ............. 370/209
5,715,276 A * 2/1998 Tran et al. .................. 375/343
5,872,808 A * 2/1999 Davidovici et al. ......... 375/206

* cited by examiner

*Primary Examiner*—Temesghen Ghebretinsae
(74) *Attorney, Agent, or Firm*—Philip Wadsworth; Charles Brown; Bruce W. Greenhaus

(57) ABSTRACT

A novel and improved method and apparatus for searching is described. Channel data is despread utilizing a matched filter structure. The in-phase and quadrature amplitudes of the despreading delivered to coherent accumulators to sum for a programmable duration of time. The amplitude accumulations are squared and summed to produce an energy measurement. The energy measurement is accumulated for a second programmable time to perform non-coherent accumulation. The resulting value is used to determine the likelihood of a pilot signal at that offset. Each matched filter structure comprises an N-value shift register for receiving data, a programmable bank of taps to perform despreading and optional Walsh decovering, and an adder structure to sum the resulting filter tap calculations.

8 Claims, 6 Drawing Sheets

PROGRAMMABLE MATCHED FILTER SEARCHER

BACKGROUND OF THE INVENTION

I. Field of the Invention

The present invention relates to communications. More particularly, the present invention relates to a novel and improved method and apparatus for detecting a pilot signal with a programmable matched filter searcher.

II. Description of the Related Art

Pseudorandom noise (PN) sequences are commonly used in direct sequence spread spectrum communication systems such as that described in the IS-95 over the air interface standard and its derivatives such as IS-95-A and ANSI J-STD-008 (referred to hereafter collectively as the IS-95 standard) promulgated by the Telecommunication Industry Association (TIA) and used primarily within cellular telecommunications systems. The IS-95 standard incorporates code division multiple access (CDMA) signal modulation techniques to conduct multiple communications simultaneously over the same RF bandwidth. When combined with comprehensive power control, conducting multiple communications over the same bandwidth increases the total number of calls and other communications that can be conducted in a wireless communication system by, among other things, increasing the frequency reuse in comparison to other wireless telecommunication technologies. The use of CDMA techniques in a multiple access communication system is disclosed in U.S. Pat. No. 4,901,307, entitled "SPREAD SPECTRUM COMMUNICATION SYSTEM USING SATELLITE OR TERRESTRIAL REPEATERS", and U.S. Pat. No. 5,103,459, entitled "SYSTEM AND METHOD FOR GENERATING SIGNAL WAVEFORMS IN A CDMA CELLULAR TELEPHONE SYSTEM", both of which are assigned to the assignee of the present invention and incorporated by reference herein.

FIG. 1 provides a highly simplified illustration of a cellular telephone system configured in accordance with the use of the IS-95 standard. During operation, a set of subscriber units 10a–d conduct wireless communication by establishing one or more RF interfaces with one or more base stations 12a–d using CDMA modulated RF signals. Each RF interface between a base station 12 and a subscriber unit 10 is comprised of a forward link signal transmitted from the base station 12, and a reverse link signal transmitted from the subscriber unit. Using these RF interfaces, a communication with another user is generally conducted by way of mobile telephone switching office (MTSO) 14 and public switch telephone network (PSTN) 16. The links between base stations 12, MTSO 14 and PSTN 16 are usually formed via wire line connections, although the use of additional RF or microwave links is also known.

Each subscriber unit 10 communicates with one or more base stations 12 by utilizing a rake receiver. A RAKE receiver is described in U.S. Pat. No. 5,109,390 entitled "DIVERSITY RECEIVER IN A CDMA CELLULAR TELEPHONE SYSTEM", assigned to the assignee of the present invention and incorporated herein by reference. A rake receiver is typically made up of one or more searchers for locating direct and multipath pilot from neighboring base stations, and two or more fingers for receiving and combining information signals from those base stations. Searchers are described in co-pending U.S. patent application Ser. No. 08/316,177, entitled "MULTIPATH SEARCH PROCESSOR FOR SPREAD SPECTRUM MULTIPLE ACCESS COMMUNICATION SYSTEMS", filed Sep. 30, 1994, assigned to the assignee of the present invention and incorporated herein by reference.

Inherent in the design of direct sequence spread spectrum communication systems is the requirement that a receiver must align its PN sequences to those of the base station. In IS-95, each base station and subscriber unit uses the exact same PN sequences. A base station distinguishes itself from other base stations by inserting a unique offset in the generation of its PN sequences. In IS-95 systems, all base stations are offset by an integer multiple of 64 chips. A subscriber unit communicates with a base station by assigning at least one finger to that base station. An assigned finger must insert the appropriate offset into its PN sequence in order to communicate with that base station. It is also possible to differentiate base stations by using unique PN sequences for each rather than offsets of the same PN sequence. In this case, fingers would adjust their PN generators to produce the appropriate PN sequence for the base station to which it is assigned.

Subscriber units locate base stations by utilizing searchers. FIG. 2 depicts a common type of serial correlator used for searching in a subscriber unit. This searcher is described in U.S. Pat. No. 5,644,591, entitled "METHOD AND APPARATUS FOR PERFORMING SEARCH ACQUISITION IN A CDMA COMMUNICATIONS SYSTEM", issued Jul. 1, 1997, assigned to the assignee of the present invention and incorporated herein by reference.

In FIG. 2, antenna 20 receives a signal comprising pilot signal transmissions from one or more base stations. The signal is downconverted and amplified in receiver 21, which generates an in-phase (I) and quadrature (Q) component of the received signal and delivers them to despreader 22. I and Q PN sequence generator 23 produces the proper I and Q PN sequences for a candidate offset as directed by searcher controller 27. Despreader 22 receives the I and Q PN sequences and despreads the I and Q received signals, passing the results to coherent accumulators 24 and 25. These accumulators integrate the amplitudes of the despread I and Q signals for a period of time specified by searcher controller 27. Coherent accumulators 24 and 25 sum the I and Q amplitudes for a period of time in which the phase of the incoming signal is approximately constant. The results are passed to energy calculation block 26 where the I and Q coherent accumulations are squared and summed. The result is accumulated in non-coherent accumulator 28. Non-coherent accumulator 28 is summing energies, and so the constant phase requirements of coherent accumulation do not apply. Energy is accumulated for a period of time as directed by searcher controller 27. The result is compared in threshold compare 29. Once the process is completed for the candidate offset programmed in I and Q PN sequence generator 23, searcher controller 27 directs a new candidate offset to be analyzed.

The searcher as just described has the advantage of great flexibility. Any number of coherent integrations, C, (within the limits of coherence time) may be performed on a candidate offset, and any number of non-coherent accumulations, M, may be performed. Any number of hypotheses to search, L, can be searched. The overall search time for a window of L hypotheses is then given by L*C*M. The drawback of this architecture is that each candidate is calculated in a serial manner. To reduce search time for given M and N requires that duplicative hardware be added.

FIG. 3 shows an alternative searcher architecture, commonly called a matched filter searcher. For a discussion of this method, see Simon, Omura, Scholtz & Levitt, SPREAD SPECTRUM COMMUNICATIONS HANDBOOK, pp. 815–822, McGraw-Hill, Inc., New York (1994).

An incoming signal is received at antenna 30 and passed to receiver 31 for downconversion and amplification. I and Q channels are then delivered to delay chains 36 and 38, respectively. Each delay chain contains N delay elements labeled DI1–DIN and DQ1–DQN. The output of each delay element is multiplied by a PN value loaded into tap value chains 35 and 37. The tap values are created with I and Q PN generators and loaded or hard coded into multiplication elements labeled PNI1–PNIN and PNQ1–PNQN. Note that in the simple case, the tap values include only 1 and −1, so inverters (or negaters) take the place of actual multipliers. The associations of delay element outputs and tap values is shown in FIG. 3. The tap values are made up of a portion of the PN sequence which is used to correlate with the incoming data. The results of all the multiplications are delivered to adders 34 and 32, where they are summed. The results are then squared and summed to create an energy calculation in block 33, the result of which is compared in threshold compare 39. Whenever the energy result is high, it is likely that a base station pilot exists and its PN generators are aligned with the portion of the PN sequences contained in the tap elements. In a single pass of the time required to cycle through the entire PN sequence, every possible offset has an energy value calculated for it.

The benefits of this architecture include parallel calculations of N hypotheses such that a result is generated once for every cycle that the delay elements are updated. This architecture is optimal for the case where the number of hypotheses to be searched, L, is equal to the entire PN space, the number of coherent accumulations desired, C, is equal to the number of taps, N, and the number of non-coherent accumulations, M, is set to one. In this scanario, the total search time will be L+N (assuming that it requires N cycles to fill the delay elements with valid data). The delay elements may already contain valid data, and in any case N is typically much smaller than the PN space, so the search time is essentially related directly to L. Compare this with the time for the serial correlator searcher described above: L*C*M =L*C.

The maximum value for N is given by the coherence time. The matched filter portion of the searcher is essentially performing coherent accumulation of despread input signals. This is the same constraint for maximum C in the prior architecture. To increase the number of non-coherent accumulations requires adding memory storage to hold an intermediate calculation for every hypothesis to search, or L additional memory elements. The search time then for M>1 is given by M*PN, where PN is the entire PN space.

The drawbacks to this architecture include lack of flexibility. It is optimal in hardware and time only for the limited circumstances set forth above. The hardware will be underutilized whenever desired C is less than the number of taps, N, or when the window to be searched, L, is less than the entire PN space and M is greater than one. In the first instance, the delay elements and PN taps exist in hardware whether or not they are used. In the second instance, the entire PN sequence must cycle through before a second non-coherent energy value is calculated. Furthermore, extra memory is required to store all the partial accumulations for each offset.

For some numerical examples, assume the PN space, PN, is 30000. We will compare a matched filter searcher as described with N=100 delay elements. Assume first that the desired search window also is 30,000, the desired C is 100, and the desired M is 1. These conditions are optimal for the matched filter searcher so its hardware will be fully utilized. The required search time will be L*M=30,000. The serial correlator searcher described above will also utilize its hardware efficiently, but its search time will be L*M*C=3,000,000, or 100 times greater. So to equal the speed performance with serial correlators, we would need to implement 100 of them in parallel. This would not be as efficient in area as the matched filter.

Now assume that with the same hardware we wish to search a window smaller than the entire PN sequence: L=1000. Assume further that coherent integrations, C, are set to only 25. Let M continue to be 1. This case demonstrates that the matched filter will not utilize all of its hardware efficiently, since ¾ of it will be unused. The overall search time, 1000, is still lower than that of the serial correlator, 1000*25=25,000, but it is only 25 times faster. This assumes that the taps can be programmed in such a way as to take advantage of the reduced window size—with fixed taps this is not the case and the search time will remain 30,000 which is actually slightly slower.

Finally, change only the assumption that M=5. Now the matched filter searcher will continue to operate at 25% hardware efficiency, and it will take M*PN or 150,000 cycles to search (and additional memory is required to store the L partial accumulations). The serial correlator will continue to operate at 100% hardware efficiency and will complete the task in L*C*M or 125,000. Clearly, as M is increased from 5, the performance gains of the serial correlator will only increase.

There are clear benefits in reducing search times ranging from initial acquisition to base-station handoff to multipath demodulation. There is a need in the art for a searcher which combines fast searching with flexibility and hardware efficiency.

SUMMARY OF THE INVENTION

A novel and improved method and apparatus for searching is described. In accordance with one embodiment of the invention, the searcher adds flexibility to the parallel computation features of a matched filter, allowing a variable number of coherent accumulations and a variable number of non-coherent accumulations to be performed at high speed for a wide range of search hypotheses in a resource efficient manner. This exemplary embodiment of the invention allows for parallel use of the matched filter structure in a time-sliced manner to search multiple windows. In addition, the searcher allows for optional independent Walsh decovering for each search window. The time-sharing approach allows for optional frequency searching of any offset.

In the exemplary embodiment, the I and Q channel data are despread utilizing a matched filter structure. The in-phase and quadrature amplitudes of the despreading delivered to coherent accumulators to sum for a programmable duration of time. The amplitude accumulations are squared and summed to produce an energy measurement. The energy measurement is accumulated for a second programmable time to perform non-coherent accumulation. The resulting value is used to determine the likelihood of a pilot signal at that offset.

Each matched filter structure comprises an N-value shift register for receiving data, a programmable bank of taps to perform despreading and optional Walsh decovering, and an adder structure to sum the resulting filter tap calculations. The matched filter structure can optionally be used in a time-sharing manner to search multiple windows as dictated by a multiplexor which supplies various streams of tap values for despreading (with optional Walsh decovering included in the tap values). In addition, an optional phase rotator can be added to apply multiplexed phase values to perform frequency searching. Every cycle the matched filter structure produces an intermediate calculation for a particular offset (with optional Walsh decovering and optional phase rotation) which includes N calculations based on the data in the shift register. Masking features may be used to allow a calculation using less than N values to be performed). The identification of certain features as optional does not imply that other features are required. Different aspects of the invention may be incorporated or omitted in different embodiments.

BRIEF DESCRIPTION OF THE DRAWINGS

The features, objects, and advantages of the present invention will become more apparent from the detailed description set forth below when taken in conjunction with the drawings in which like reference characters identify correspondingly throughout and wherein.

DETAILED DESCRIPTION OF THE PREFERRED EMBODIMENTS

Figure 1:
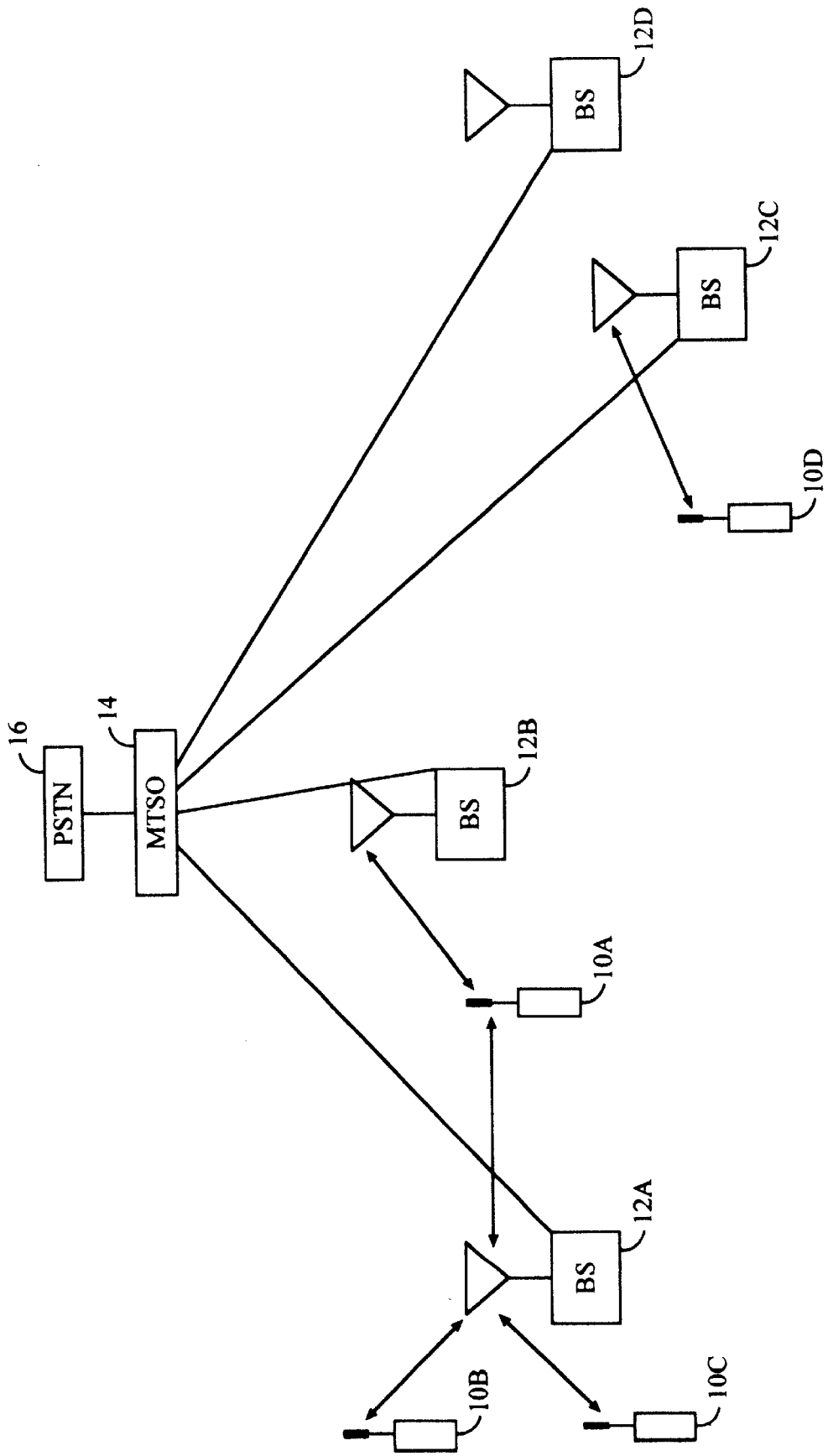
FIG. 1 is a block diagram of cellular telephone system.
Figure 2:
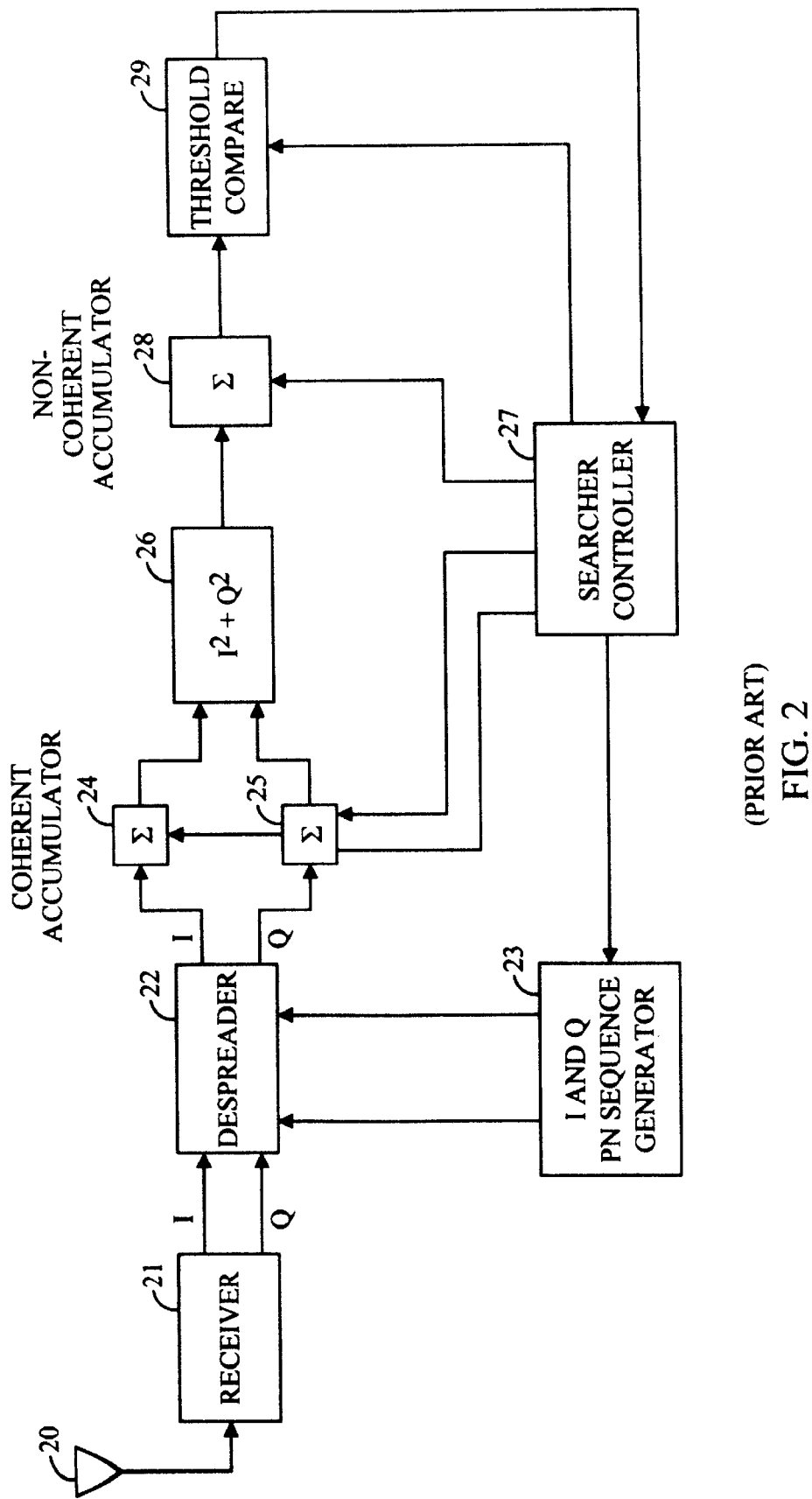
FIG. 2 is a block diagram of a prior art serial correlator searcher.
Figure 3:
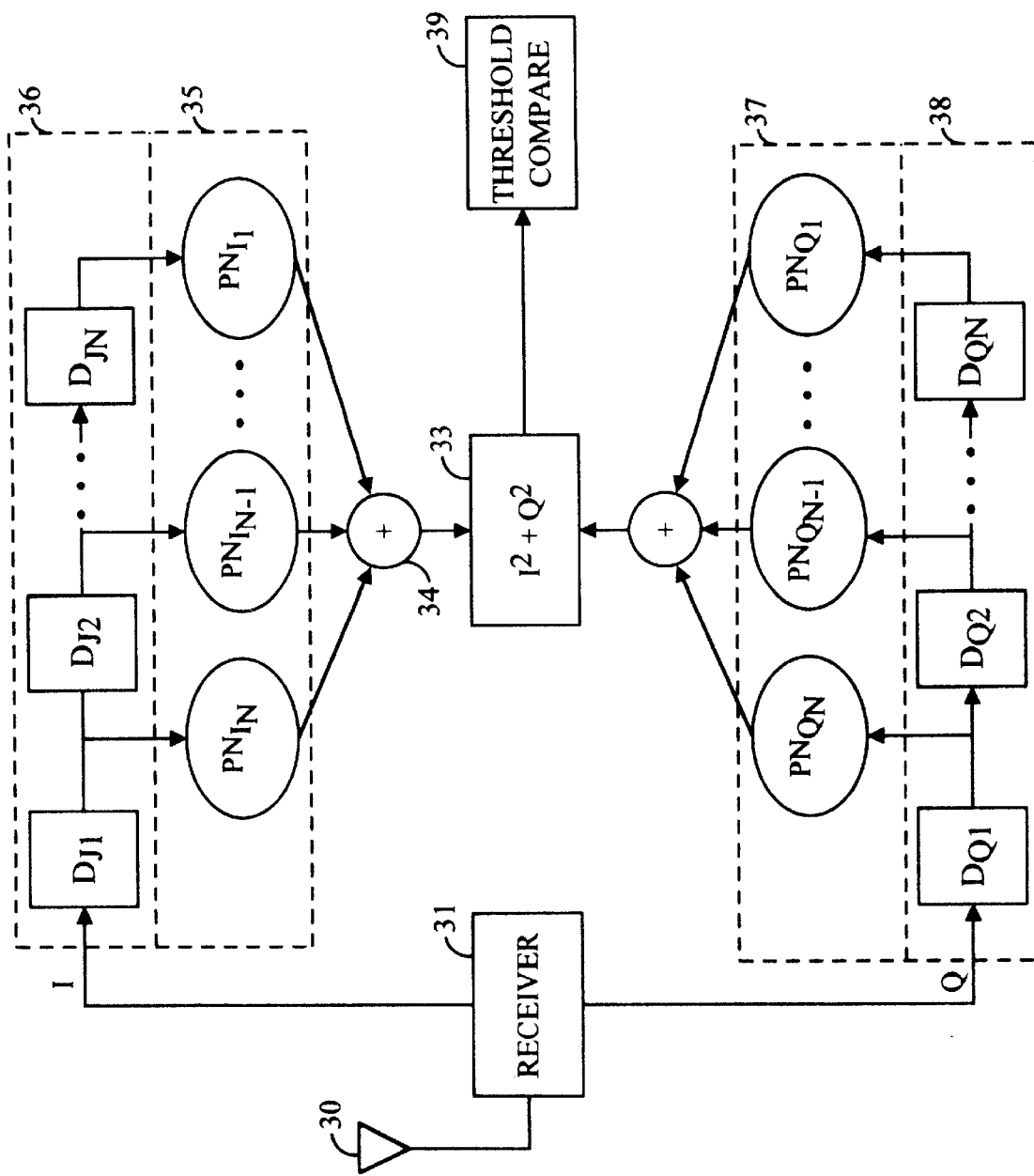
FIG. 3 is a block diagram of a prior art matched filter searcher.
Figure 4:
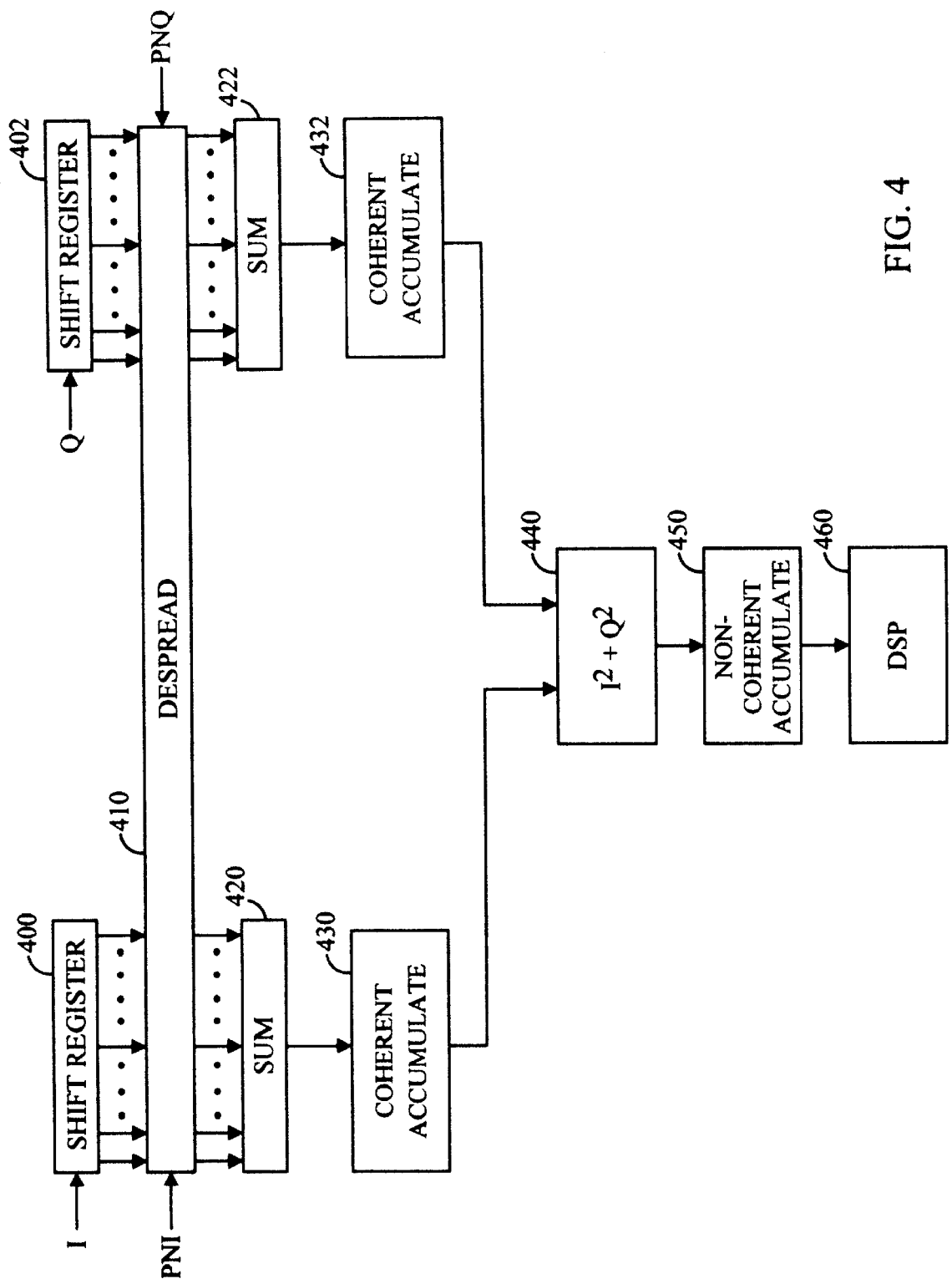
FIG. 4 is a block diagram configured in accordance with the exemplary embodiment of this invention.

A block diagram configured in accordance with the one embodiment of the invention as shown in FIG. 4. I and Q data (Hereinafter $D_I$ and $D_Q$) enters shift registers 400 and 402, respectively. The size of the matched filter component of this invention is given by N, the number of memory locations in the shift registers. Data is continually loaded and shifted through the shift registers at a constant rate. In the exemplary embodiment, data is loaded in at twice the chip rate. This allows for searching on every chip and half-chip boundary.

Figure 5:
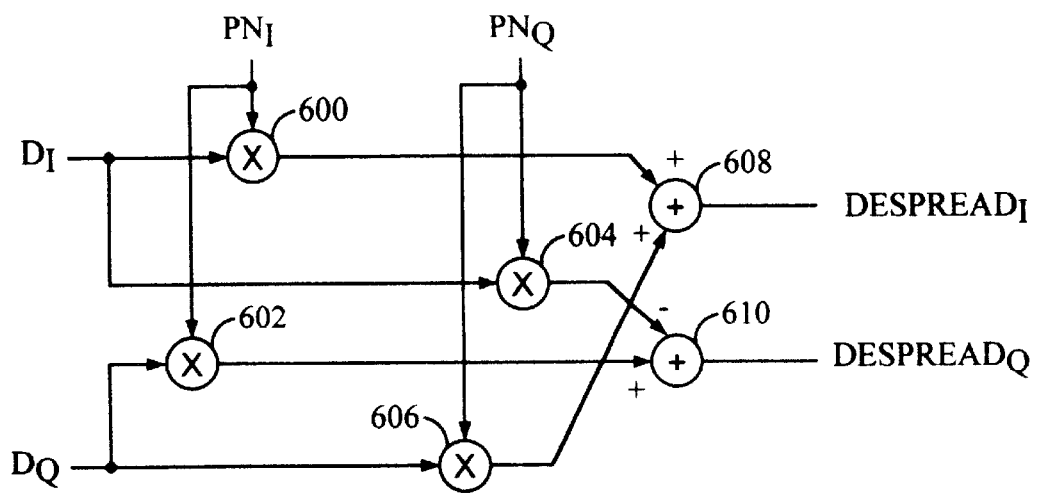
FIG. 5 depicts a QPSK despreader.

The data in shift registers 400 and 402 are then correlated with N-bit portions of the I and Q PN sequences (Hereinafter $PN_I$ and $PN_Q$) which are loaded into despreader 410. To despread a QPSK spread pilot signal, complex despreading is performed: $(D_I+jD_Q)\cdot(PN_I+jPN_Q)=(D_I PN_I + D_Q PN_Q)+j(D_Q PN_I - D_I PN_Q)$. FIG. 5 depicts one stage of the N-stage QPSK despreader. One of the N values of $D_I$ is multiplied by the corresponding tap value $PN_I$ in multiplier 600 and by the corresponding tap value $PN_Q$ in multiplier 604. Similarly, $D_Q$ is multiplied by tap values $PN_I$ and $PN_Q$ in multipliers 604 and 606, respectively. The output of multipliers 600 and 606 are summed in adder 608. The output of multiplier 604 is subtracted from the output of multiplier 602 in adder 610. The output of adder 608 is the despread I value. The output of adder 610 is the despread Q value. Since there are N stages, there will be N such complex results.

Figure 6:
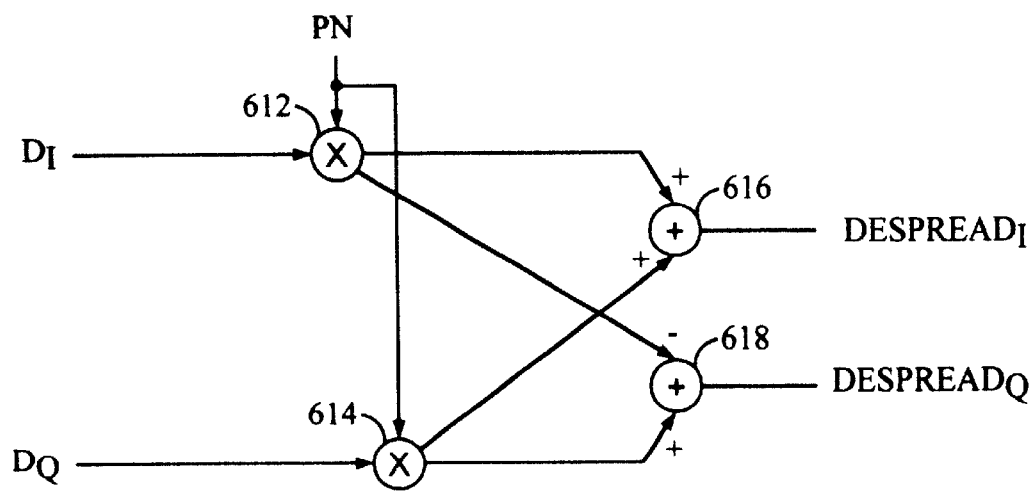
FIG. 6 depicts a BPSK despreader.

The present invention is also useful for BPSK despreading. In this case there is only a single PN sequence to correlate with, which provides the tap values for both the I and Q in despreader 410. The circuit shown in FIG. 5 can be used as is with the single PN sequence being delivered to both $PN_I$ and $PN_Q$. FIG. 6 shows the simplified despreader which can be used if only BPSK despreading is desired. $D_I$ and $D_Q$ are multiplied by the PN sequence in multipliers 612 and 614 respectively. The results are summed in adder 616 to produce the despread I value. The output of multiplier 612 is subtracted from multiplier 614 in adder 618 to produce the despread Q value. Again there are N stages, so there will be N complex results.

Although FIG. 5 and FIG. 6 show multipliers in use, simplifications are known in the art. When the tap values are binary, as they are in the exemplary embodiment, consisting only of the values 1 and −1, and the proper data format is chosen for $D_I$ and $D_Q$, the despreading step can be accomplished utilizing only XOR gates and multiplexors (details not shown).

Referring again to Fir. 4, the N despread I and despread Q values produced in despreader 410 are summed respectively in summers 420 and 422. Each time the data in shift registers 400 and 402 change, new sums are calculated in summers 420 and 422. Each sum is an N-chip coherent accumulation of a particular offset. The process is repeated for a programmable number of cycles without changing the tap values in despreader 410. For example, in the exemplary embodiment the matched filter size, N, is 64. Suppose a search window size, L, of 64 and a coherent accumulation, C, of 256 was desired. In this case, the tap values appropriate for the beginning of the window are loaded into despreader 410 and data is cycled through the shift register, producing results from summers 420 and 422 each cycle.

Each result is loaded into coherent accumulators 430 and 432, respectively. These accumulators accommodate multiple accumulations at a single time. In the exemplary embodiment, they are RAM based. During each cycle, the appropriate partial accumulation is retrieved, added to the output of either summer 420 or 422, and the resultant partial accumulation is stored again in the RAM. In our example, when 64 cycles have passed, the first 64 I and Q sums have been loaded into accumulators 430 and 432. Each of these sums corresponds to a C of 64, since that is the width of the matched filter.

During this time, a new set of tap values for despreader 410 have been calculated. These are calculated so that the same 64 offset hypotheses that were tested in the first pass can be tested again. If the tap values were not changed, a new offset would be tested with each cycle until the entire PN space had been searched (like a standard matched filter searcher described above). The matched filter procedure is repeated again for another 64 cycles. This time, each result is summed with the corresponding partial accumulation for its offset as stored in accumulators 430 and 432. After 64 cycles have passed, each partial accumulation is made up of two 64 chip partial accumulations, corresponding to a C of 128. The process is repeated twice more, changing the taps each time until the accumulators have accumulated four 64 chip values for the desired C of 256. In this configuration, the searcher can perform coherent accumulation on any C that is an integer multiple of N. The window size that can be concurrently searched is determined by the number of partial accumulations which can be stored in accumulators 430 and 432. (The upper bound on C is determined by the number of bits of precision employed and scaling techniques used, if any. Those skilled in the art can readily design circuits which accommodate a desired C value.)

The loading of PN tap values is performed as follows: the PN sequences will be generated differently depending on whether the same set of hypotheses is to be tested or a new set is beginning. In the exemplary embodiment, the PN sequences are generated via linear feedback shift register (LFSR) based PN generators. The timing of tap generation is best explained with an example. In the exemplary embodiment, the matched filter is N values wide so an N bit tap sequence must be generated. For simplicity we will assume that data changes at the chip rate which is the same rate the PN generators must be updated. This is in contrast to the exemplary embodiment in which data is updated at twice the chip rate, so two data samples are correlated with each PN state. Suppose that we wish to accumulate C=192 values for a window size of 128. Assume our PN generator has generated the appropriate first 64 I and Q tap values which are loaded into despreader 410. 64 sets of data will cycle through shift registers 400 and 402. For each set a 64 value coherent I sum is calculated and stored in non-coherent accumulator 430 and a 64 value coherent Q sum is calculated and stored in accumulator 432. Each coherent sum corresponds to one of the first 64 sequential offset hypotheses being searched. Since a C of 192 is desired, the above 64 cycles must be repeated 3 times to reach 192. But appropriate steps must be taken to properly align the PN taps in despreader 410 to the incoming data. We desire that the same offsets be tested again to produce the second set of coherent values. The PN generators used to create the incoming data have moved forward 64 chips. We also need to load a new set of PN values 64 chips forward to retest the same offsets. These values are created by the PN generators while the first 64 sums are generated. The process is repeated for the third set to create coherent accumulations of 192 chips.

Now the first half of the search window has been performed. The PN generators used to created the incoming data have moved forward by 64 chips again. If we loaded a similar advanced PN sequence into despreader 410, we would collect more data on the first 64 offsets, which is not needed in this example. Instead, we wish to introduce an offset of 64 to test the next 64 offsets. We can do this by simply not updating the PN values (since the PN sequence in the incoming data has advanced in relation to the values presently in despreader 410). When the first 64 calculations are performed for the second half of the window, a new set of PN values must be loaded in despreader 410 to collect more data on the same offsets, just as described above. The process repeats until 192 chips worth of data have been accumulated.

When the coherent accumulations of the I and Q data are complete as just described, the resultant values are squared and summed ($I^2+Q^2$) as shown in energy calculator 440. The result for each offset is loaded into noncoherent accumulator 450. This accumulator is a multi-accumulation capable accumulator similar to accumulators 430 and 432. For the programmed number of non-coherent accumulations, M, the values of independent coherent accumulations are accumulated for each offset in the search window. Each time the energy is stored in non-coherent accumulator 450, the partial accumulations in coherent accumulators 430 and 432 are reset for another C calculations.

Those skilled in the art will employ myriad solutions to process the results stored in non-coherent accumulator 450. In the exemplary embodiment, the results of non-coherent accumulator 450 are delivered to DSP 460 where the values are examined to determine which offset in the search window, if any, likely corresponds to the location of a pilot signal. DSP 460, which can be any DSP or microprocessor capable of performing the desired operations, can control all of the matched filter searching procedures. It may be dedicated to the searcher, or the search functions may make up just a fraction of the various tasks that DSP 400 performs in the operation of the subscriber unit. The entire process as just described can be repeated for multiple search windows if necessary.

FIG. 5 depicts the exemplary embodiment of the present invention. A received signal is collected by antenna 501. The received signal is processed in a receiver labeled RX_IQ_DATA 500. The receiver performs all processing necessary to provide an I and Q data stream in digital form sampled at eight times the chip rate. A variety of other sampling rates could also be used, as known in the art. These samples can then be delivered through mux 504 to subsampler 506 where the chip×8 rate I and Q sample streams are reduced to chip×2 streams which is the rate chosen among other possibilities for the exemplary embodiment. The chip×2 I and Q data streams are then fed to mux 508.

Sample RAM 502 and muxes 504 and 506 make up a data source option. I and Q samples can be stored in sample RAM 502 at the chip×8 rate or at chip×2. Chip×8 rate streams can subsequently be delivered through mux 504 to subsampler 506 as described above. Alternatively, chip×2 streams can bypass subsampler 506 through mux 508. Clearly, less RAM storage is required to store chip×2 data than to store chip×8 data. This data source option is not mandatory to practice the present invention. It adds the extra benefit of being able to process data while the rest of the receiver or mobile station is in a low-power or idle mode. Multiple search windows of offset hypotheses can be tested on the same group of sampled data. As long as the results are generated before external conditions have changed so as to make them stale, this procedure can generate power savings. Sample RAM 502 can optionally be loaded with values other than those from receiver 500. It is also possible to utilize the stored data from sample RAM 502 for other demodulation activities (for which chip×8 rate sampling may be appropriate). It is conceivable that sample RAM 502 will be loaded for later additional processing while simultaneously performing a search on the samples being stored.

Gain 510 is an optional block for providing any amplification which may be necessary. Rotator 512 is another option to be added in situations where a frequency offset exists whose removal is desired. The results are delivered to N-bit shift register 514. It should be clear from the previous paragraphs that any combination or none of the aforementioned options are required to practice this invention. The I and Q data streams can be directly delivered to N-bit shift register 514. Furthermore, to perform QPSK despreading and coherent searching it is clear that circuitry for both an I and Q path needs to be employed (or equivalent time-sharing) as was shown in FIG. 4. For simplicity and clarity the I and Q paths will be shown as a single path. For example, N-bit shift register 514 is comprised of 2 N-bit storage elements, one for the I values and a second for the Q values.

The I and Q samples are then delivered to QPSK despreader 518. The samples are despread with PN sequences delivered through mux 516. The present invention lends itself well to parallel utilization through time-sharing. Four different PN streams with optional Walsh covering are shown as inputs to mux 516. In the exemplary embodiment, the circuits are operating at an internal clock rate of eight times the chip rate (chip×8). As stated above, the I and Q samples are delivered at a rate of chip×2. This allows for searches to be performed of offsets in between each chip as well as on chip boundaries. As such, the matched filter hardware can be utilized 4 times for each set of data. Therefore, four different PN sequences can be used to search 4 different windows simultaneously (or a single PN sequence with 4 different Walsh codes, or any combination thereof). By increasing the system clock in relation to the data rate, greater or fewer windows can be searched simultaneously.

The despread values are shown entering mask block 519. This is an optional block which can be used to allow less than N coherent calculations to be performed. For example, in the exemplary embodiment, N is set to 64. If only C=32 was desired, the mask could be set to zero out 32 of the 64 results. This is also convenient when deploying this invention with legacy algorithms. Suppose an algorithm is set to require C of 152, for example. The mask can be disabled for 2 iterations of 64 value calculations. The remaining 152−128=24 chips worth of data can be added by setting the mask accordingly. It will be obvious to those skilled in the art that alternative mask locations are possible to perform the same function, including zeroing out the data in the N-bit shift register 514. (The mask can optionally be applied further down the adder tree at the cost of resolution).

The resulting N I values and N Q values will be delivered to adder tree 520, where a total I sum and a total Q sum will be calculated. A typical adder tree is shown in FIG. 5, but any adder structure can be employed to perform the sum (for example, a serial adder running faster than the matched filter).

Mux 522 and phase rotator 524 make up another option which can enhance the present invention. Up to four different phase values, $\theta_0$, $\theta_1$, $\theta_2$, and $\theta_3$ can be included through mux 522 and rotator 524. This allows frequency searching of four frequencies on a phase offset hypothesis. Of course, fewer or greater frequencies can be searched if the system clock choice provides fewer or greater spare cycles in relation to the incoming I and Q data rate. The total number of frequency searches and PN searches utilizing mux 516 can not be greater than the number of spare cycles for a single matched filter structure. For example, in the exemplary embodiment data is updated at a rate of chip×2. The system clock runs at chip×8, so there are 4 cycles to utilize. Any combination of 4 searches can be performed for each set of data. For example, a single PN sequence can be used for all despreading in despreader 518. Then four different frequencies can be searched. Alternatively, a single frequency can be searched and four different PN/Walsh combinations can be searched, or 2 different PN/Walsh combinations can be searched with 2 different frequencies, or 4 different PN/Walsh combinations each having a different frequency, and so on.

Figure 7:
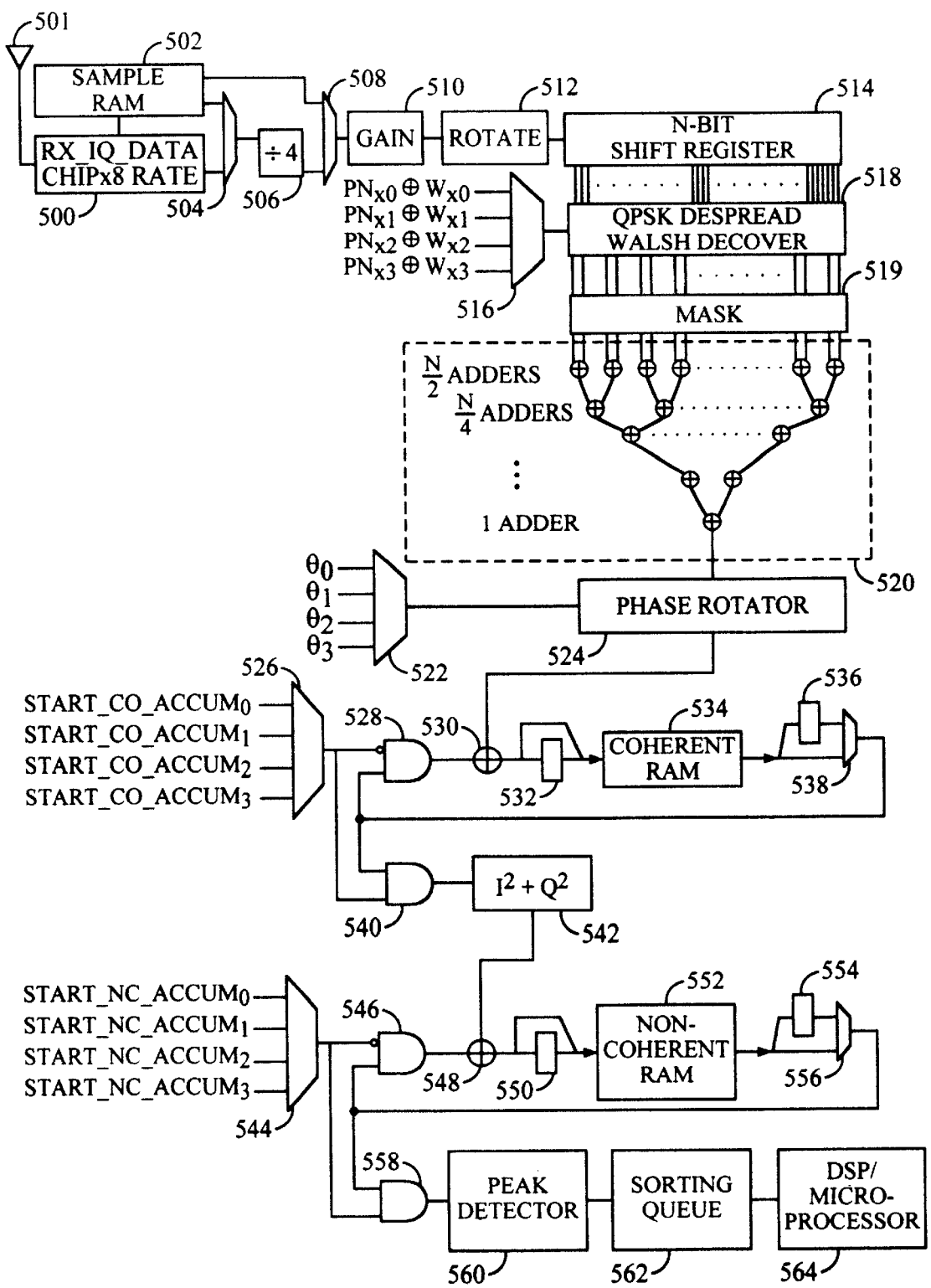
FIG. 7 is a more detailed block diagram configured in accordance with the present invention.

As described in relation to FIG. 4, the results from the matched filter must be coherently accumulated. The exemplary embodiment's coherent accumulator is made up of items 526–540 in FIG. 7. Those skilled in the art will recognize that there are a variety of means to produce accumulators which can easily be substituted to enable the present invention. Mux 526 and gates 528 and 540 show one method to effect the timing. Four searches can be performed for each cycle of incoming data. The accumulations of each of these need not be time aligned, so provision is made to start each of the four accumulations by the inputs to mux 526: start_co_accum0–start_co_accum3. When any of these signals is asserted, the value from rotator 524 will be added in adder 530 to zero, which effectively resets that accumulation. Otherwise, the partial accumulation will be added to the value from rotator 524 in adder 530 as taken from mux 538, described shortly.

Items 532–538 make up the exemplary storage element of the accumulator. The storage element needs to be able to be written to and read from during each cycle. A dual port RAM could be employed, as could a single port RAM being accessed at twice the cycle rate. Two single port rams alternately read and written could accomplish the task as well. Or, single port coherent RAM 534 can be deployed as shown. Since there is always a delay between the time a particular partial accumulation is stored and when it needs to be accessed, buffering can be used to allow the RAM to alternately be read or written in each cycle. The RAM width will be twice the width of a partial accumulation. One partial accumulation is stored in buffer 532 while coherent RAM 534 is read. The read data will comprise two partial accumulations, the first of which is stored in buffer 536, the second of which proceeds through mux 538 to gate 528 as described above. In alternating cycles, the partial accumulation from adder 530 along with one stored in buffer 532 will be written to coherent RAM 534. Since no data is available to be read, mux 538 will select the partial accumulation from buffer 536 to supply to gate 528. This procedure is known as double packing.

The same start signal coming from mux 526 controls the output of the final coherent accumulations. When the accumulation is not starting, gate 540 will be disabled such that its output will be zero. When a new accumulation is beginning, which corresponds to the prior being completed, the value from mux 538 is supplied through gate 540 to energy calculator 542 (note that gate 528 simultaneously prevents this value from entering summer 530). Remember that there exists both an I and Q path up until this point, so energy accumulator 542 receives an I and a Q value from two coherent accumulators, even though only one is shown in FIG. 5 for clarity. The I value is squared and added to the squared Q value and the result is presented to summer 548. Note that the output of energy accumulator 542 is zero for all cycles but one per coherent accumulation period.

Items 544–558 make up a single non-coherent accumulator (I and Q are now merged) which is identical to the accumulators described above. Summer 548 supplies partial accumulations of energy values to a double-packed RAM comprised of buffer 550, non-coherent RAM 552, buffer 554, and mux 556. The timing control is effected similarly through mux 544 and signals start_nc_accum0–start_nc_accum3 in conjunction with gates 546 and 558.

The results of the non-coherent accumulations, as passed through gate 558, are the energy values associated with each offset hypothesis. As described above, the entire structure can be controlled via a microprocessor or DSP as shown in block 564. The values can be used to determine the location of a pilot, by, for example, comparing each value to a predetermined threshold.

In the exemplary embodiment, peak detector 560 receives the energy values for the hypotheses. The peak detector is used to suppress the above-threshold energy value which is a half chip apart from the energy peaks. The algorithm for peak detection is as follows. For E(n), defined as the energy at the nth offset, a peak is detected if the following is true:

$$E(n-1) < E(n) \text{ AND } E(n) >= E(n+1) \tag{1}$$

The energy values at window boundaries may be saved and further filtered to remove potential false peaks at the borders. This may be done in additional back end filters, potentially in DSP 564. The remaining peaks after peak filtering are delivered to sorting queue 562. Sorting queue 562 is used to generate four to eight maximum values for each search window. Each energy value and its associated PN position (or offset) are stored in the queue. DSP 564 is notified through interrupt when a window search is complete and given access to the values stored in the sorting queue.

The present invention provides a great deal of flexibility, much of which has already been described. Recall the variables L, C, M and N (number of hypotheses, coherent accumulations, non-coherent accumulations, and number of taps, respectively) from prior discussion. Include the additional variable for frequency searching, f. In order to increase searcher throughput, the clock rate can be increased from that given in the exemplary embodiment. The throughput scales directly with the clock rate. Define the T as the number of time-sharing cycles available for parallel use of the architecture due to clock rate scaling. This invention allows for any combination of searches given by the product, LCMf, equal to the total number of cycles a serial correlator would have to perform to accomplish such a search. This invention can perform the search at a much greater rate: LCMf/NT.

There is also scalability at the architectural level of any particular implementation of this invention. For approximately the same amount of hardware, a number of configurations can be deployed depending on what sort of searching characteristics are desired.

Following are three example configurations each including approximately the same complexity (and in this case assuming the same clock rate in each: data changing at chip×2 and system clock of chip×8). One option is to utilize a single register of size N=32 shared by four matched filters of size N=32 (each of the four matched filters containing four parallel searchers via time-multiplexing as shown in FIG. 5). This option provides a minimum C=32, minimum L=64, and the number of parallel searchers, S=16. A second option is to use a single register of size N=64 and two parallel N=64 matched filters. Here the minimum C=64, minimum L=128, and S=8. A third comparably sized option is to use one N=128 searcher as shown in FIG. 5. Here minimum C=128, minimum L=256, with S=4. These three examples are not meant to be exhaustive but serve to illustrate a few of the potential embodiments of the present invention.

Thus, a method and apparatus for a programmable matched filter searcher has been described. The description is provided to enable any person skilled in the art to make or use the present invention. The various modifications to these embodiments will be readily apparent to those skilled in the art, and the generic principles defined herein may be applied to other embodiments without the use of the inventive faculty. Thus, the present invention is not intended to be limited to the embodiments shown herein but is to be accorded the widest scope consistent with the principles and novel features disclosed herein.

We claim:

1. A programmable matched filter searcher comprising:
   a shift register for receiving sets of incoming in-phase(I) data;
   a shift register for receiving sets of incoming quadrature (Q) data;
   a PN generator for generating PN sequences;
   a matched filter having:
   a despreader for receiving said sets of I data, said sets of Q data, and said PN sequences and for producing sets of despread I values and producing sets of despread Q values;
   a summer for summing said sets of despread I values to produce I sums;
   a summer for summing said sets of despread Q values to produce Q sums;
   an I accumulator for receiving said I sums and accumulating them in sets to produce a set of accumulated I sums;
   a Q accumulator for receiving said Q sums and accumulating them in sets to produce a set of accumulated Q sums; and
   an energy calculator for receiving sets of accumulated I sums and sets of accumulated Q sums, squaring respective ones of sets of accumulated I sums, squaring respective ones of sets of accumulated Q sums, and summing the results of said squares of respective ones of sets of I and Q sums to produce sets of energy values.

2. The programmable matched filter searcher of claim 1 further comprising an accumulator for receiving said sets of energy values and producing sets of accumulations of ones of said sets of energy values.

3. The programmable matched filter searcher of claim 2 wherein:
   I and Q PN sequences are produced by said PN generator; and
   said despreader performs QPSK despreading.

4. The programmable matched filter searcher of claim 2 wherein said despreader performs BPSK despreading.

5. The programmable matched filter searcher of claim 2 further comprising a multiplexor for receiving multiple PN sequences and delivering them for time-sharing of said loadable matched filter to produce additional sets of sums based on said multiple PN sequences.

6. The programmable matched filter searcher of claim 2 further comprising:
   a multiplexor for receiving one or more phase values; and
   I and Q rotators for receiving outputs said I and Q loadable matched filters and rotating said outputs according to the phase output of said multiplexor, and delivering the results to said I and Q accumulators.

7. A method for performing programmable matched filter searching comprising the steps of:
   a) storing sets of I and Q data;
   b) producing PN sequences;
   c) despreading said sets of I and Q data with said PN sequences to produce I and Q despread values;
   d) summing results of said despread I values;
   e) summing results of said despread Q values;
   f) accumulating the resultant summed despread I values;
   g) accumulating the resultant summed despread Q values;
   h) squaring the accumulated despread I values;
   i) squaring the accumulated despread Q values; and
   j) summing both said squares.

8. The method of claim 7 further comprising the step of accumulating said sum of squares.

* * * * *